United States Patent [19]

Miyake et al.

[11] Patent Number: 4,805,359
[45] Date of Patent: Feb. 21, 1989

[54] METHOD OF APPLYING FLOOR VIBRATION-DAMPING WORK AND VIBRATION-DAMPING FLOOR DEVICE

[75] Inventors: Hiraku Miyake, Yokohama; Tadahiro Yano, Tokyo; Yoshio Tanno, Noda; Yutaka Hayamizu, Yokohama; Satoru Aizawa; Masahiko Higashino, both of Tokyo; Ikuo Shimoda, Fujisawa, all of Japan

[73] Assignees: Takenaka Komuten Co., Ltd.; Oiles Industry Co., Ltd., both of Japan

[21] Appl. No.: 99,326

[22] Filed: Sep. 21, 1987

[51] Int. Cl.⁴ .............................................. E04H 9/02
[52] U.S. Cl. ...................................... 52/167; 248/638
[58] Field of Search ........................... 52/167; 248/638

[56] References Cited

U.S. PATENT DOCUMENTS

| | | | |
|---|---|---|---|
| 1,651,411 | 12/1927 | Porter | 52/167 |
| 3,986,367 | 10/1976 | Kalpins | 52/167 X |
| 4,040,590 | 8/1977 | Baratoff | 248/638 X |
| 4,371,143 | 2/1983 | Ishida et al. | 52/167 X |
| 4,402,483 | 9/1983 | Kurabayashi et al. | 248/638 X |
| 4,565,039 | 1/1986 | Oguro et al. | 52/167 |
| 4,617,769 | 10/1986 | Fyfe et al. | 52/167 |
| 4,662,133 | 5/1987 | Kondo | 52/167 |
| 4,726,161 | 2/1988 | Yaghoubian | 248/638 X |

FOREIGN PATENT DOCUMENTS

| | | |
|---|---|---|
| 213271 | 9/1984 | German Democratic Rep. ... 52/167 |
| 103823 | 8/1977 | Japan . |
| 104323 | 9/1977 | Japan . |
| 104324 | 9/1977 | Japan . |
| 104325 | 9/1977 | Japan . |
| 36144 | 8/1983 | Japan . |
| 36145 | 8/1983 | Japan . |

Primary Examiner—J. Karl Bell
Attorney, Agent, or Firm—Mason, Fenwick & Lawrence

[57] ABSTRACT

A method of applying a floor vibration-damping work and a floor vibration-damping device supporting horizontally displaceably respective supports points of the floor structure on a fixed floor and supporting the other respective points of said floor structure on the fixed floor with a position restoring function relative to the horizontal displacement, as well as a triggering function and a damping function during said displacement.

13 Claims, 9 Drawing Sheets

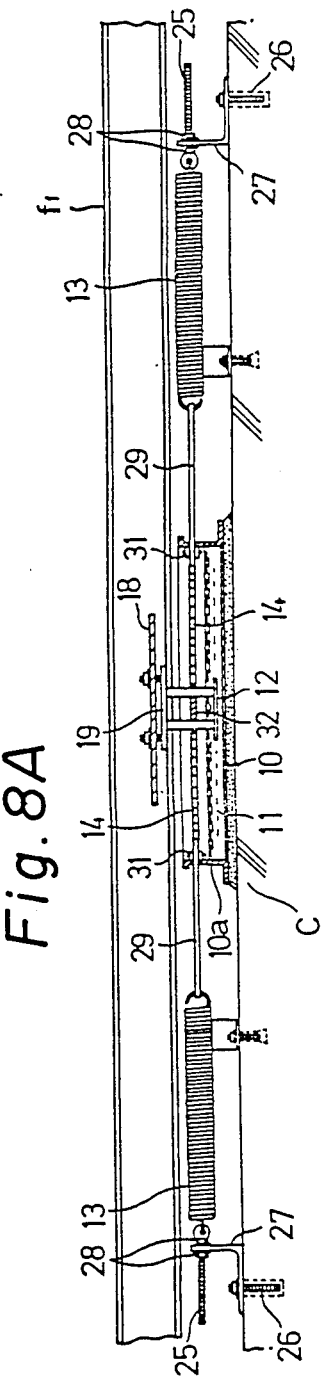
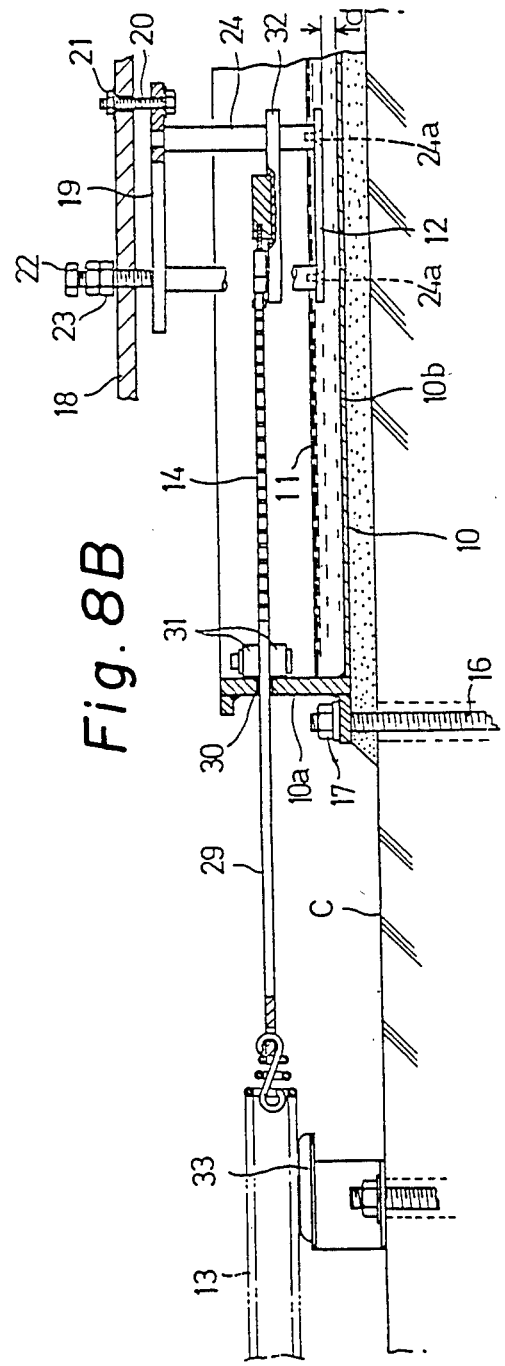
Fig. 8A
Fig. 8B

METHOD OF APPLYING FLOOR VIBRATION-DAMPING WORK AND VIBRATION-DAMPING FLOOR DEVICE

The present invention relates to a method of applying a floor vibration-damping work executed for decreasing (damping) seismic forces applied, for example, to floors of electronic computer rooms, floors on which other important precision equipments are installed or floors of a room where explosives, chemicals, or other dangerous products are contained thereby preventing the operation shutdown or damages of equipments or occurrence of dangerous states, as well as a floor vibration-damping device which is used directly for the practice of the method. More specifically, it relates to a method of applying floor vibration-damping work and a floor vibration-damping device which is provided with a movable support portion and a damper effect portion independently from each other, the movable support portion supporting a floor structure horizontally displaceably with a minimum resistance and the damper effect portion having a restoring function after the displacement of the floor structure, as well as a triggering function and a damping function preventing excess displacement (deformation) during displacement of the floor structure. And further, the present invention relates to a spring damper device for use in a vibration-damping floor providing a restoring function after a displacement of a floor structure, as well as a triggering function and a damping function during the displacement.

A method of floor applying vibration-damping work and a floor vibration-damping device, for example, described in Japanese Patent Laying-Open No. 52-103823 are adapted such that a sliding plate is secured substantially on a lower floor slab, a base plate is slidably disposed on the sliding plate, support portions for the floor structure are mounted to a frame body on the base plate and a horizontal coil spring and a horizontal damper secured at one ends thereof to the lower floor slab are mounted to the frame body. That is, the movable support portion and the damper effect portion of the floor structure are composited into an integrated structure.

The method of floor applying vibration-damping work and floor vibration-damping device described respectively in Japanese Patent Application Laying-Open Nos. 52-104323, 104324 and 104325 are also based on substantially the same theory.

Further, the floor vibration-damping device as described in Japanese Patent Publication No. 50-36144 is adapted such that a support for securing equipments to be protected against vibrations (that is, the floor structure itself) are slidably disposed within a rectangular horizontal frame substantially similar to a plane shape of the support by means of low friction elements and a horizontal coil spring and a horizontal damper are mounted between the frame and the support. In this constitution, the movable support portion and the damper effect portion of the floor structure are also composited integrally.

Further, the floor vibration-damping device as described in Japanese Patent Publication No. 50-36145 is based on the substantially same structure mentioned above.

In the floor vibration-damping device, it is basically considered to reduce the natural frequency number of the vibration-damping device to less than a principal frequency number of external forces, that is, to reduce the response acceleration by making the frequency period longer and, accordingly, it has been demanded to reduce the spring constant of the position restoring spring as low as possible.

However, since the conventional examples mentioned above comprise a composite constitution adapted to serve both for supporting the floor structure, that is, bearing of the vertical load and for receiving the horizontal force such as a position restoring function and a damping function after the displacement of the floor structure, the number of the movable support portions is tended to be restricted inevitably upon practical execution in view of the demand for the cost, restriction with respect to the space and the working efficiency, whereby the vertical load of the floor structure exerted per one unit of floor vibration-damping device is increased relatively. Accordingly, this results in a problem for the strength of the underlying slab supporting the movable support portions and, depending on the case, disposition of the floor vibration-damping device may be difficult unless the underlying slab is reinforced in the existent engineering work.

Further, in the case of the support portion using the sliding member as in the example mentioned above, the frictional coefficient is extremely increased to make the resistance greater upon horizontal displacement of the movable support portions, as compared with the constitution of using rolling member such as bearing balls and there is a limit for the use of a restoring spring with an ideally small spring constant in view of the position restoring function. That is, if an excessively weak restoring spring is used, it results in a problem that a residual displacement is caused after the displacement of the floor structure.

Further, although a piston damper is used for the damping function to prevent excess deformation (displacement) in the conventional embodiments mentioned above, the piston damper has a drawback that the directionality is predetermined. That is, since the vibration-damping floor causes a large displacement, a piston damper having a long stroke, for example, of about 30 cm is required and, since the piston damper has a directionality, the movement of the piston is not smooth. Furthermore, a piston damper of a long stroke causes a problem of increasing significantly the cost.

The object of the present invention is to provide a method of applying floor vibration-damping work, a floor vibration-damping device or a spring damper device for use in a vibration-damping floor capable of increasing variations in view of the design and the execution of the work irrespective of the extent of the floor surface area, the planar shape and the load of the floor, whereby the vibration-damping floor can be made excellent and the total cost can be reduced.

The object of the present invention can be achieved by a method of applying floor vibration-damping work comprising a step of supporting respective support points of a floor structure on a fixed floor so as to receive only a vertical load of said floor structure with a minimum resistance for a horizontal displacement of said floor structure and a step of supporting the other respective support points of said floor structure on said fixed floor with a position restoring function relative to said horizontal displacement, as well as a triggering function and a damping function during said displacement.

More specifically, the method of applying floor vibration-damping work according to the present invention has the following constitution as shown by the embodiment illustrated in the drawings.

The floor structure F is supported at respective support points in such a state that they receive only the vertical load with the minimum resistance for the horizontal displacement by means of a movable support portion B utilizing a bearing ball 3. While on the other hand, a damper effect device A having a position restoring function to the horizontal displacement of the floor structure F, as well as a triggering function and a damping function during the displacement of the floor structure F is disposed between the floor structure F and the fixed floor C such as an underlying slab.

In summary, since the vertical load support portion (movable support portion B) and the horizontal force : support portion (damper effect portion A) of the floor structure F are constituted independently from each other while sharing their functions and, particularly, since the vertical load support portion is constituted as a movable support portion B of an extremely simple, small and inexpensive structure such as having a bearing ball, it is possible to use them for supporting the floor structure F in a great number as just required depending on the shape of the plane, the area of the plane and the load of the floor structure F thereby reducing and properly dispersing the vertical load received per one unit of the movable support portion B.

Accordingly, it is possible to dispose the vertical load support portions depending on the strength of the fixed floor C thereby install a floor vibration-damping device with no problem for the strength of the fixed floor. In addition, since the rolling friction coefficient of the bearing ball is extremely low, the resistance upon horizontal displacement of the floor structure F in the movable support portion B is low thus enabling the use of a position restoring spring with an ideally small spring constant.

While on the other hand, the damper effect portion A can be used by a required number of amounts independently by selecting a most desired arrangement also taking into consideration the plane shape, plane surface area and the like of the floor structure F, with regardless of the amount, arrangement, etc. of the movable support portion B and the number of them can be much decreased generally as compared with that of the movable support portion B. Accordingly, there is less restriction in view of the space and a great variation can be obtained in view of the design and the execution of the work. Then, the overall economical advantage is much better than that of the conventional composite constitution.

Furthermore, for applying the floor work, it is possible to at first assemble the floor structure over the movable support portion B and then dispose the damper effect portion A.

Moreover, the object of the present invention mentioned above can be achieved by a floor vibration-damping device comprising a movable support portion for supporting respective support points of a floor structure and a spring damper portion disposed between said floor structure and a fixed floor, said movable support portion comprising a lower ball receiving steel plate disposed on said fixed portion, a bearing ball disposed on said lower steel plate and an upper ball receiving steel plate secured to said floor structure and placed on said bearing ball, said spring damper portion comprising a damper main body of a shallow and flat vessel shape mounted on and secured to said fixed floor, a viscous fluid contained by a predetermined amount in said damper main body, a movable member attached to said floor structure, immersed in said viscous fluid and ensuring a predetermined gap between a lower surface of said movable member and a bottom of said damper main body, a coil spring secured to said fixed floor at one end thereof, a rope-like member not transmitting a compressive force and being connected to the other end of said coil spring at one end thereof and connected to said movable member at the other end thereof, and a reaction force receiving roller attached to said rope-like member and abutted against an inner surface of said damper main body.

More specifically, the floor vibration-damping floor device according to the present invention has the following constitution which is used directly for practicing the method of applying the floor vibration-damping work. And it is constituted also as shown b the embodiment illustrated in the drawings below:

Fundamentally, the device comprises, in combination, a movable support portions B for supporting respective support points of a floor structure F and spring damper portion A disposed between the floor structure F and the fixed floor C such as an underlying slab.

Then, the movable support portion B comprises a lower ball receiving steel plate 1 disposed on the floor support portion C, a bearing ball 3 disposed freely movably on the lower steel plate 1 and an upper ball receiving steel plate 4 attached to the side of the floor structure F and disposed on the bearing ball 3.

Further, the spring damper portion A comprises a highly rigid damper main body 10 of shallow and flat vessel shape secured to the fixed floor C and a viscous fluid 11 contained by a predetermined amount in the damper main body 10. While on the other hand, a movable member 12 attached to the side of the floor structure F and having a flat lower surface in parallel with the bottom of the damper main body is immersed in the viscous fluid 11 to secure a certain gap d between the movable member 12 and the bottom of the damper main body 10. Then, a rope-like member 14 not transmitting the compression force is connected to one end of a coil spring 13, which is attached at the other end thereof to the fixed floor C such as an underlying slab, the rope-like member 14 is connected at the other end thereof to the movable member 12, and a reaction force receiving roller 15 attached to the intermediate portion between the rope-like member 14 and the coil spring 13 is abutted against the inner surface of the side wall 10a of the damper main body 10.

In the most preferred embodiment, a set of the coil spring 13 and the rope-like member 14 is disposed in four directions at a right angle with each other on the horizontal plane around the movable member 12 as the center, and the coil spring 13 is provided with a pre-tension or pre-compression force corresponding to the external triggering value of the floor structure F.

Since the movable support device B has constitution of utilizing the rolling of the bearing ball 3 so as to receive only the vertical load of the floor structure F and, particularly, the bearing ball 3 is put between the upper and the lower ball receiving steel plates 4, 1 which are hardened to a sufficiently high hardness, there is no problem for receiving (transmitting) the vertical load and it conducts rolling movement with the minimum resistance.

Moreover, since the bearing ball 3 moves only by ½ stroke relative to the horizontal displacement stroke of the floor structure F, the diameter for the upper and the lower ball receiving steel plates 4, 1 may be about ½ as compared with the constitution where the ball is disposed to the moving side in a case for satisfying the identical displacement stroke thereof, that is, it may be as small as ¼ in view of the specific surface area, economical advantage can be obtained for the expensive heat treated steel plates.

Referring then to the spring damper portion A, it does not receive the vertical load of the floor structure F at all and utilizes the tension coil spring 13 and the viscosity resistance of the viscous fluid 11 so as to attain just the necessary position restoring function after displacement of the floor structure, as well as the triggering function and the damping function upon displacement.

Among all, it is possible to use such a coil spring 13 as having an ideally small spring constant for decreasing the natural frequency number of the vibration-damping floor device, for example, of about 3 kg/cm, which is excellent in the vibration-damping performance.

Further, since the damping function is provided as the viscous resistance of the fluid 11 to the movable member 12 and it has no directionality at all, it is excellent in the performance corresponding to the seismic inputs, for which the directionality can not be forecast at all. Further, the damping performance can be controlled in a broad range by adjusting the extent of the gap between the movable member 12 and the bottom of the damper main body 10.

Then, when a pre-tension force, for example, of about 10 kg is introduced to the coil spring 13, the pre-tension force is usually exerted only between the spring receptacle on the side of the fixed floor C and the side wall 10a of the damper main body 10 against which the reaction force receiving roller 15 is abutted, and it does not exert the effect of the force at all to the movable member 12. Then, if the floor structure F receives a horizontal force (seismic input), the structure does not cause displacement unless the force exceeds the extent of the pre-tension force of the coil spring 13. This is a so-called triggering function and the external triggering value can freely be set and controlled as the pre-tension force of the coil spring 13.

That is, if the floor structure F displaces, the tension is exerted as the restoring action only for the coil spring 13 in the direction of the tension of the coil spring 13. While on the other hand, the displacement is completely absorbed as the mere bending (distortion) of the rope-like member 14 for the coil spring 13 on the side of the compression, and neither reception nor exertion of force is resulted. Accordingly, the triggering function can exactly provide its effect, while the external triggering value can be set accurately.

Furthermore, the object of the present invention mentioned above can be achieved by a spring damper device for use in a vibration-damping floor providing a restoring function after a displacement of a floor structure, as well as a triggering function and a damping function during said displacement by supporting horizontally displaceably respective support points of said floor structure on a fixed floor, comprising;

(a) a damper main body of a shallow and flat vessel shape mounted on and secured to said fixed floor, (b) a viscous fluid contained by a predetermined amount in said damper main body, (c) a movable member attached to said floor structure, immersed in said viscous fluid and ensuring a predetermined gap between a lower surface of said movable member and a bottom of said damper main body, (d) a rope-like member not transmitting a compressive force and being connected to the other end of said coil spring at one end thereof and connected to said movable member at the other end thereof, and (e) a reaction force receiving roller attached to said rope-like member and abutted against an inner surface of said damper main body.

More specifically, the spring damper device according to the present invention has the following constitution as shown by the embodiment illustrated in the drawings below.

That is, a spring damper device for use in a vibration-damping floor provides a position restoring function after a displacement of a floor structure, as well as a triggering function and a damping function during the displacement by supporting horizontally displaceably respective support points of the floor structure on a fixed floor.

The spring damper device comprises a highly rigid damper main body 10 of shallow and flat vessel shape secured to the fixed floor C and a viscous fluid 11 contained by a predetermined amount in the damper main body 10. While on the other hand, a movable member 12 attached to the side of the floor structure F and having a flat lower surface in parallel with the bottom of the damper main body is immersed in the viscous fluid 11 to secure a certain gap d between the movable member 12 and the bottom of the damper main body 10. Then, a rope-like member 14 not transmitting the compression force is connected to one end of a coil spring 13, which is attached at the other end thereof to the fixed floor C such as an underlying slab, the rope-like member 14 is connected at the other end thereof to the movable member 12, and a reaction force receiving roller 15 attached to the intermediate portion between the rope-like member 14 and the coil spring 13 is abutted against the inner surface of the side wall 10a of the damper main body 10.

In the most preferred embodiment, a set of the coil spring 113 and the rope-like member 14 is disposed in four directions at a right angle with each other on the horizontal plane around the movable member 12 as the center, and the coil spring 13 is provided with a pre-tension or pre-compression force corresponding to the external triggering value of the floor structure F.

Figure 1:
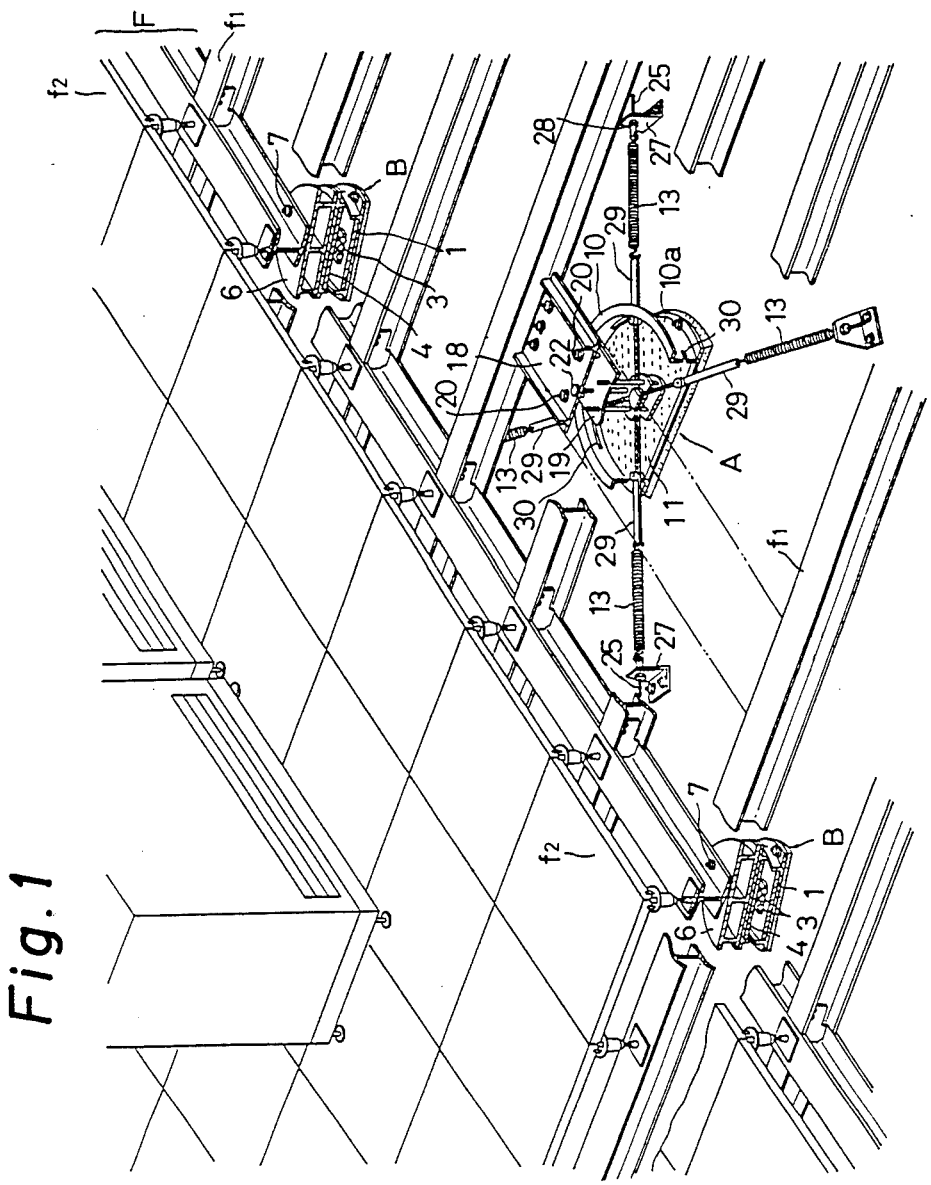
FIG. 1 is a partially cut away perspective view illustrating the state of practicing the floor vibration-damping device according to the present invention.
Figure 2:
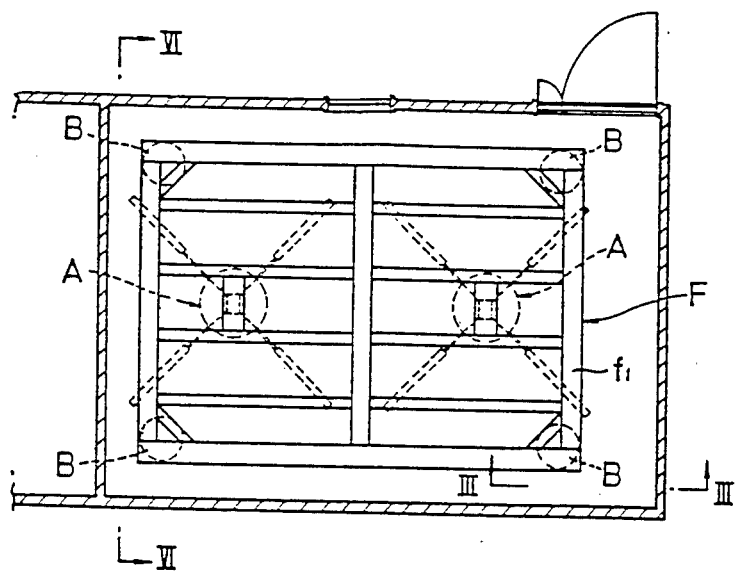
FIG. 2 is a plan view for the main structure of the floor vibration-damping.
Figure 5:
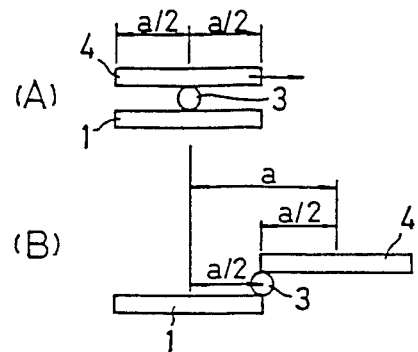
Figure 6:
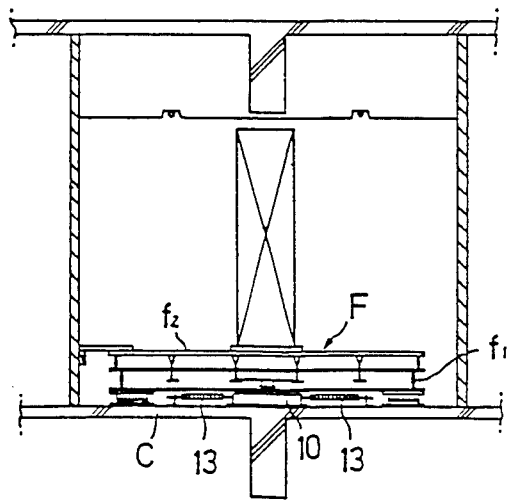
Figure 7:
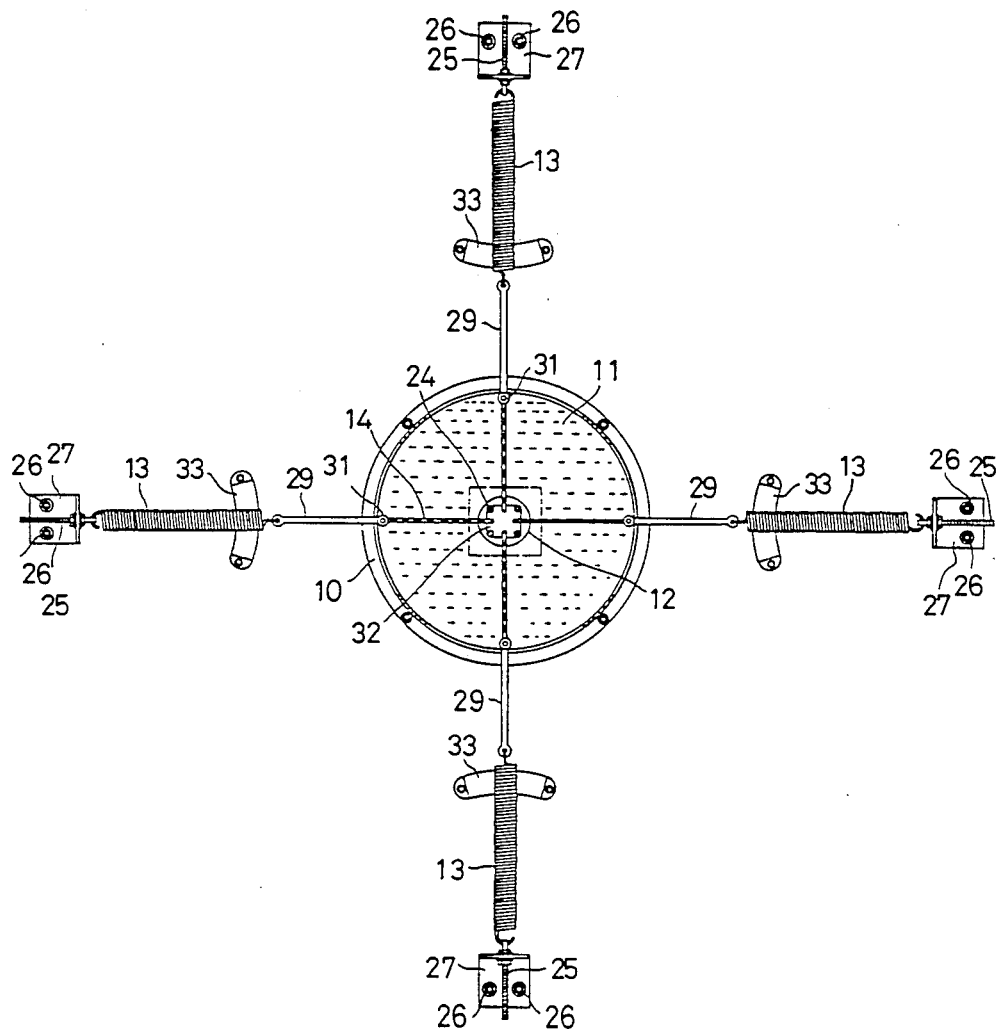
Figure 9:
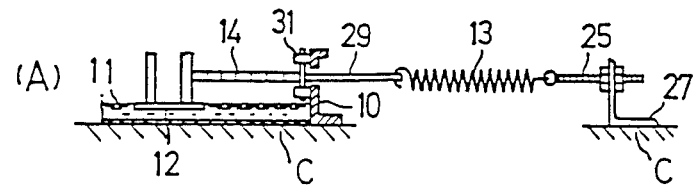
Figure 9:
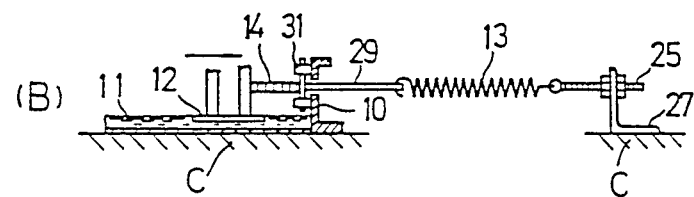
Figure 9:
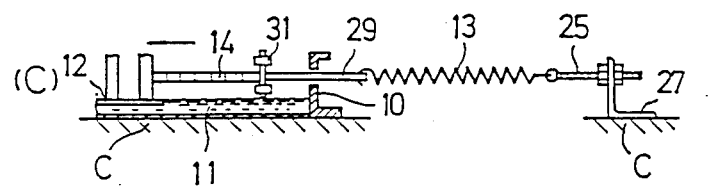
Figure 10:
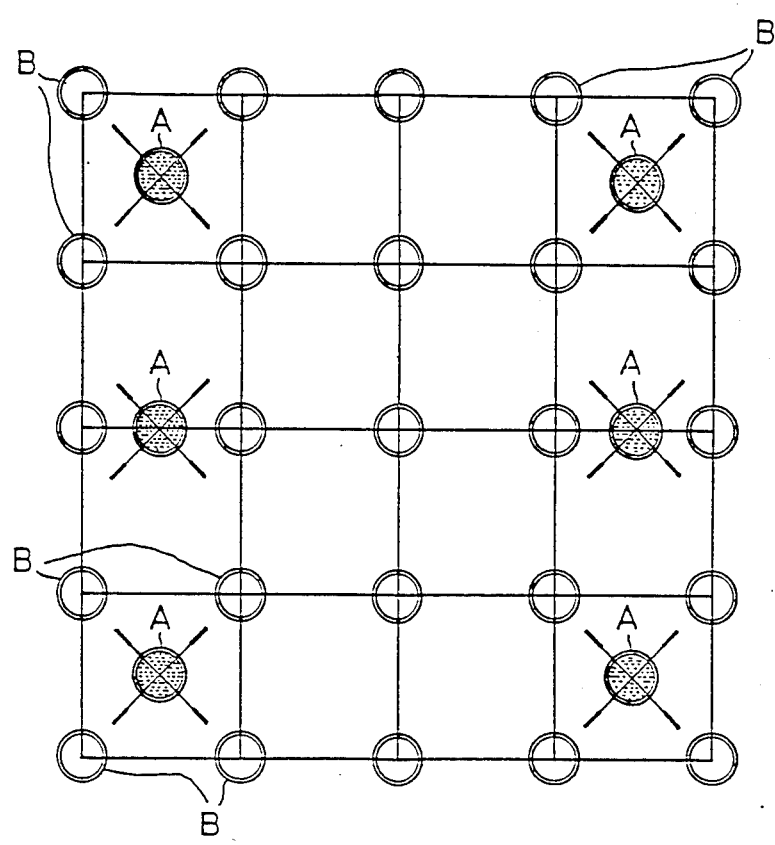
Figure 11:
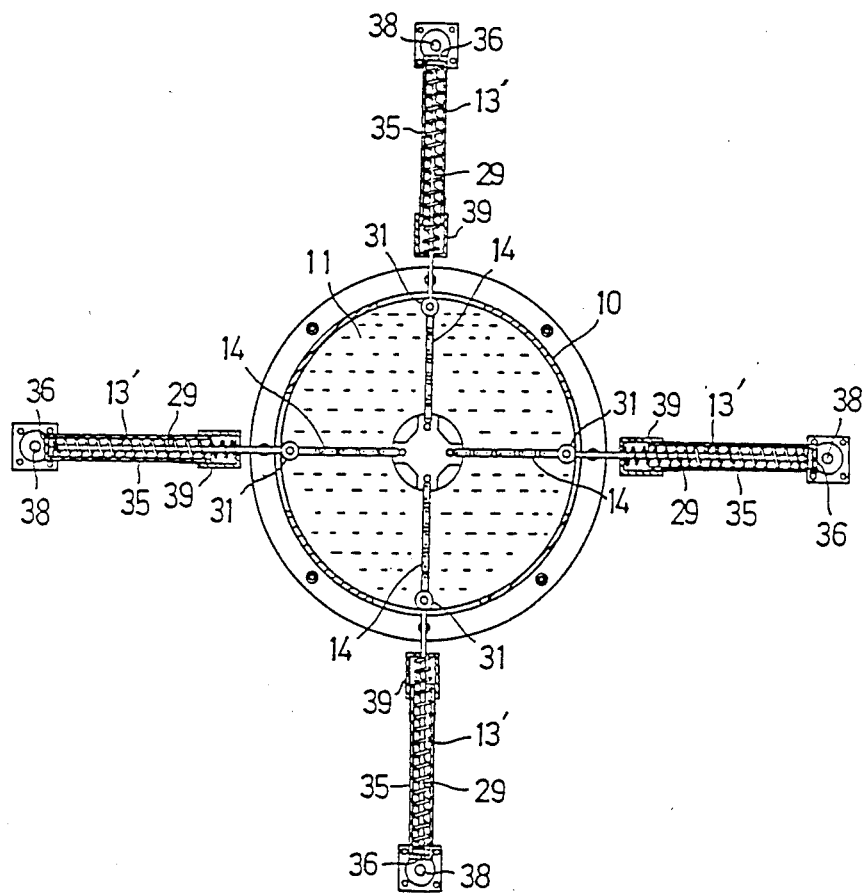

FIGS. 4 A and 4 B are vertical and horizontal cross sectional views for the movable support portion;

FIGS. 5 A and 5 B are explanatory views for the operation principle of the movable support portion;

FIG. 6 is a view taken along arrows VI—VI in FIG. 2;

FIG. 7 is a plan view for the spring damper portion;

FIGS. 8 A and 8 B are vertical cross sectional views for the entire and the principal portion of the spring damper portion;

FIGS. 9 A, 9 B and 9 C are views for the operation principle of the spring damper portion;

FIG. 10 is a view illustrating the planer horizontal of the vibration-damping floor; and FIG. 11 is a plan view for another embodiment of the spring damper portion.

Explanation will then be made to a preferred embodiment of the present invention illustrated in the drawings.

In FIGS. 1 through 9, B represents a movable support portion supporting each of the support points of the floor structure F, and A represents a spring damper portion disposed between the floor structure F and the fixed floor, i.e., the underlying slab C with an aim of position restoring, etc. after displacement of the floor structure F.

Figure 3:
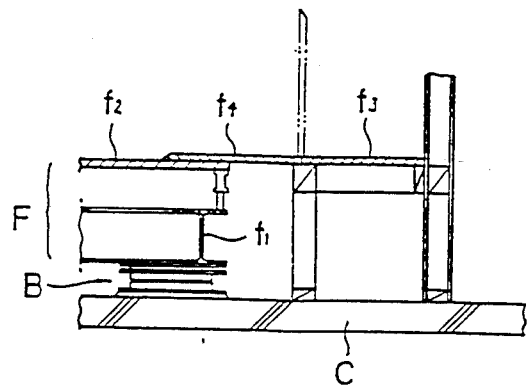
FIG. 3 is a view taken along arrow III—III in FIG. 2.

The floor structure F comprises an iron beam support f1 assembled in a rigid plate-like shape and a floor panel f2 laid over the support f1 (refer to FIG. 3). The movable support device B is disposed to each of the support points at four corners of the support f1 thereby supporting the support f1 on the underlying slab C as the floor support device (FIGS. 2 and 3).

Figure 4A:
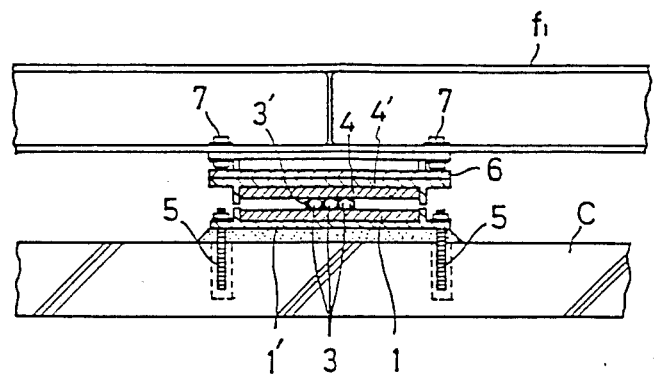
Figure 4B:
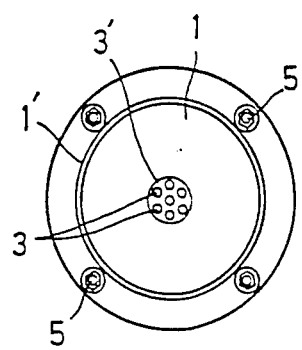

As shown specifically in FIGS. 4A, 4B, a holder 1' of a shallow dish-like shape for firmly holding a lower ball receiving steel plate 1 of a flat disk plate of about 300 $\phi$ diameter applied with hardening treatment is secured and disposed on the underlying slab C by means of anchor bolts 5.

Bearing balls 3 each of about 18 $\phi$ are used by the number of seven (refer to FIG. 4B), which are equally arranged and firmly retained by a retainer 3' and then disposed about at the center on the steel plate 1.

While on the other hand, a support ring 6 having a holder 4' of a shallow dish-like shake mounted downwardly to the lower surface of the support ring 6 is to the support points of the support f1 by means of bolts 7, and the upper ball receiving steel plate 4 contained in the holder 4' is placed on the bearing ball 3. The upper steel plate 4 is also a flat disc plate of about 300 $\phi$ diameter applied with hardening.

Accordingly, the floor structure F is supported by the movable support portions B disposed at four corners thereof in such a manner that only the vertical load of the floor structure F is beared and the floor structure F is horizontally displaceably with an extremely low frictional coefficient due to the rolling movement of the bearing balls 3. Accordingly, the floor panel 2 and the peripheral fixed floor f3 form a series of floor surfaces by way of flexible buffer floor f4 (FIG. 3).

If the vertical load received by one unit of the movable support portion B becomes excessively large, it can be coped by increasing the number of the support points of the floor structure F or further, if there is any problem in view of the strength of the underlying slab C, the movable support portion B can freely be disposed while displacing (deviating) the support point to a position where there is no such problem for the strength.

By the way, for the structure of the movable support portion B, since the bearing ball 3 is merely put between the upper and the lower steel plates 4, 1 as schematically illustrated in FIG. 5A, if the horizontal displacement for a stroke a is resulted to the floor structure F, the a/2 stroke thereof is shared by the movement of the bearing ball 3 (B in FIG. 5). After all, it is sufficient that the upper and the lower steel plate 4, 1 have the diameter of a size a and it can be constituted at a reduced cost and in a small size irrespective of the large stroke for the horizontal displacement.

However, for the movable support portion B, the ordinary bearing ball type support portion may be employed, and, for reference, the plane contacting type sliding support portion can be employed.

Then, the spring damper portion A is disposed by two units at the right and left to the central portion of the floor structure F (FIG. 2).

FIG. 7 and FIGS. 8A, 8B show the detailed structures of the spring damper portion A, in which a damper main body 10 of a circular shallow vessel-like shape made of steels with about 650 $\phi$ of inner diameter and about 100 mm of height is horizontally secured by means of an anchor bolt 16 and a nut 17.

A viscous liquid 11 such as of high molecular viscous substance, for example, silicon is contained to the inside of the damper main body 10 in an amount of about 20 mm depth.

While on the other hand, a damper receiving support 18 is bolted horizontally to the support f1 of the floor structure F and a movable member support bed 19 is mounted and secured to the central portion of the lower part of the support 18 by means of a suspending bolt 20, a nut 21 screwed in the bolt 20, a retaining bolt 22 and a lock nut 23. That is, the height of the support bed 19 and, thus, the height of the movable member 12 can be adjusted by operating the bolt 20 and the bolt 22.

The movable member 12 is composed of a steel disc, for example, of about 6 mm thickness and about 150 $\phi$ diameter, which is detachably attached by means of a screw 24a to the lower end for each of the four rods 24. The upper and of the rod 24 is attached to the support bed 19. In this way, the movable member 12 is opposed in parallel above the bottom face 10b of the damper main body 10 usually with a gap d of about 10 mm, and the movable member 12 is immersed in a viscous fluid 11. The gap d can be adjusted by means of the bolt 20 and the bolt 22 described above. Further, the movable member 12 can be replaced with that of a diameter depending on the required extent of the damping performance by operating the screw 24a.

By the way, the damping force is 34 kg when the vibration speed is 20 cm/s, temperature is at 20° C., the diameter of the movable member 12 is 150 $\phi$ and the viscous liquid 11 is silicon oil.

Then, reference 13 in the drawing represents a tension coil spring having a spring constant of about 3 kg/cm and about 800 mm of length. The outer end of the spring 13 is connected with a tension adjust bolt 25 and secured to a support angle 27 which is secured by the anchor bolt 26 to the underlying slab C as the fixed floor by means of an adjust nut 28. That is, the strength, i.e., the extent of the pre-tension of the spring 13 can be adjusted depending on the amount of the adjust nut 28 screwed.

A connection rod 29 made of a flat steel plate of 20 mm width and 250 mm length is connected to the inner end of the spring 13 and the connection rod 29 is inserted into the damper main body 10 through a slit 30 formed in the circumferential direction at a position higher than the liquid level of the viscous liquid 11 in the vertical side wall 10a of the damper main body 10. Then, a reaction force receiving roller 31 attached to the inner end of the connection rod 29 is abutted against the inner surface of the side wall 10a. Accordingly, the pre-tension of the coil spring 13 is exerted usually only between the support angle 27 and the side wall 10a and not exerted on the movable member 12.

In the drawing, reference 14 represents a roller chain as a rope-like member not transmitting the compression force, which is connected with the connection rod 29 at one end thereof and, connected at the other end thereof with a flat plate 32 integrated with the rod 24 of the movable member 12. The roller chain 14 has a length equal with the distance between the inner end of the connection rod 29 and the connection point to the flat plate 32.

As shown in FIG. 7, the spring 13, etc. is disposed by four in the four directions at a right angle with each other around the movable member 12 as the center. Then, for coping with the uncertainty for the directionality of the seismic inputs, the slit 30 for passing the connection rod 29 therethrough is formed with an arcuate angle of about 80° in the circumferential direction. Further, the spring 13 is supported by a sliding plate 33 in order to cope with the horizontal twist and the vertical slackening.

However, the spring 13, etc. may be disposed by three in the three directions each at an equi-angular distance of about 120° around the vertical member 12 as the center.

Referring to the structure and the operation state of the spring damper portion A as schematically illustrated in FIGS. 9A, 9B, and 9C, when a horizontal external force is applied to the floor structure F (the support f1) and the movable member 12 tends to be displaced, the coil spring 13 disposed on the side to be pulled resists there against and the displacement of the floor structure F is prevented unless the external force exceeds a pre-tension previously set as the external triggering force value (for example about 10 kg). This is the triggering function.

While on the other hand, for the spring 13 on the compression side, the compression force is not transmitted at all, because the roller chain 14 is bent (FIG. 9B). Accordingly, only the value of the pre-tension set to the coil spring 13 on the pulling side accurately exerts as the external triggering force value. The extent of the value can be adjusted by the bolt 25 and the nut 28.

When the movable member 12 is displaced by an external force exceeding the pre-tension applied to the coil -spring 13, the spring force on the pulling side exerts as the position restoring force (FIG. 9C). This is the position restoring function after the displacement of the floor structure F.

Further, when the movable member 12 displaces as described above, the viscous sharing resistance of the viscous fluid 11 exerts as a damping function for preventing excess displacement.

FIG. 10 illustrates an embodiment for the constitution of a horizontal arrangement of the floor vibration-damping device applied to a floor with a large planer surface area.

That is, the number of support point of the floor is increased as required, the movable support portions B are disposed to the respective positions and the number of the spring damper portions A is also increased.

FIG. 11 shows an embodiment of the spring damper portion A using a compression coil spring 13'.

That is, the spring 13' contained in a spring casing 35 which is attached at the outer end thereof to the underlying slab C by way of a universal joint 38 in order to bear the support reaction force, and the inner end of the spring 13' is abutted against a spring receptacle 39 screwed into the spring casing 35. Then, the outer end of the coil spring 13' abutting against the spring receptacle 39 is attached to the outer leading end of the connection rod 29 passed through the hollow portion of the spring 13'. That is, the external triggering force value is applied as the pre-compression due to the screwing amount of the spring receptacle 39.

Accordingly, the operation principle in this example is identical with that using the tension coil spring 13 in FIG. 7 and it can be used quite in the same way.

According to the method of applying floor vibration-damping work and the floor vibration-damping device of the present invention, since the movable support portion B and the spring damper portion A relative to the horizontal displacement of the floor structure F are constituted individually and independently from each other and since each of the support points for the floor structure F is supported only by means of the movable support portion B, many variations can be obtained in view of the design and the execution of the work irrespective of the extent of the floor surface area, the planer shape and the load of the floor, whereby the working procedures and working efficiency for the floor structure F can be made excellent and the total cost can be reduced.

Moreover, it is possible to conduct such design and execution of work so as to decrease the vertical load exerted per one unit of the movable support portion B, whereby the resistance upon horizontal displacement of the floor structure F can be reduced extremely and a restoring coil spring 13 with an identically low spring constant can be used thereby to constitute a floor of excellent vibration-damping performance.

Furthermore, the spring damper portion A providing the position restoring function after displacement of the floor structure F, as well as the triggering function and the damping function during displacement of the floor structure F does not receive the vertical load of the floor structure F at all and the pre-tension force set to the coil spring 13 exerts completely accurately as the external triggering force and is easily adjusted.

In addition, since the damping function utilized the viscous sharing resistance of the high viscous fluid 11, it has no particular directionality and can exert equally in all of 360° directions, high reliability can be obtained for completely acting to seismic inputs for which the directionality can not be forecast. In addition, since the damping performance can be adjusted by changing the extent of the gap between the movable member 12 and the bottom of the damper main body 10, excellent vibration-damping performance can be expected also as the synthetic effect thereof.

According to the spring damper device for use in a vibration-damping floor of the present invention, since the spring damper device A is constituted individually and independently from the movable support portion B, the spring damper device can be preferably constituted based on a particular function itself, whereby the vibration-damping floor can be made excellent and the total cost can be reduced.

Moreover, the pre-tension force set to the coil spring exerts completely accurately as the external triggering force and is easily adjusted.

What is claimed is:

1. A floor vibration-damping device comprising a movable support portion for supporting respective support points of a floor structure and a spring damper portion disposed between said floor structure and a fixed floor, said movable support portion comprising a lower ball receiving steel plate disposed on said fixed portion, a bearing ball disposed on said lower steel plate and an upper ball receiving steel plate secured to said floor structure and placed on said bearing ball, said spring damper portion comprising a damper main body of a shallow and flat vessel shape mounted on and secured to said fixed floor a viscous fluid contained by a predetermined amount in said damper main body, a movable member attached to said floor structure, immersed in said viscous fluid and ensuring a predetermined gap between a lower surface of said movable member and a bottom of said damper main body, a coil spring secured to said fixed floor at one end thereof, a rope-like member not transmitting a compressive force and being connected to the other end of said coil spring at one end thereof and connected to said movable member at the other end thereof, and a reaction force receiving roller attached to said rope-like member and abutted against an inner surface of said damper main body.

2. The device of claim 1, in which said coil spring comprises a tension spring or a compression spring and is applied with a pre-tension force or a pre-compression force respectively corresponding to an external triggering value.

3. The device of claim 1, in which sets of said coil spring and said rope-like member are disposed in four directions at a right angle with each other on a horizontal plane around said movable member.

4. The device of claim 1, in which said coil spring and said rope-like member are connected by way of a rigid connection rod and a reaction force receiving roller is attached to said connection rod.

5. The device of claim 2, in which sets of said coil spring and said rope-like member are disposed in four directions at a right angle with each other on a horizontal plane around said movable member.

6. The device of claim 2, in which said coil spring and said rope-like member are connected by way of a rigid connection rod and a reaction force receiving roller is attached to said connection rod.

7. A spring damper device for use in a vibration-damping floor providing a restoring function after a displacement of a floor structure, as well as a triggering function and a damping function during said displacement by supporting horizontally displaceably respective support points of said floor structure on a fixed floor, comprising;

(a) a damper main body of a shallow and flat vessel shape mounted on and secured to said fixed floor,
(b) a viscous fluid contained by a predetermined amount in said damper main body,
(c) a movable member attached to said floor structure, immersed in said viscous fluid and ensuring a predetermined gap between a lower surface of said movable member and a bottom of said damper main body,
(d) a rope-like member not transmitting a compressive force and being connected to the other end of said coil spring at one end thereof and connected to said movable member at the other end thereof, and
(e) a reaction force receiving roller attached to said rope-like member and abutted against an inner surface of said damper main body.

8. The device of claim 7, in which said coil spring comprises a tension spring or a compression spring and is applied with a pre-tension force or a pre-compression force respectively corresponding to an external triggering value.

9. The device of claim 7, in which sets of said coil spring and said rope-like member are disposed in four directions at a right angle with each other on a horizontal plane-around said movable member.

10. The device of any one of claims 7, in which said coil spring and said rope-like member are connected by way of a rigid connection rod and a reaction force receiving roller is attached to said connection rod.

11. The device of claim 7, in which said movable member is attached to said floor structure by a movable member support bed fixed to said movable member and a bolt for adjusting the extent of said gap.

12. The device of claim 8, in which sets of said coil spring and said rope-like member are disposed in four directions at a right angle with each other on a horizontal plane-around said movable member.

13. The device of claim 9, in which said coil spring and said rope-like member are connected by way of a rigid connection rod and a reaction force receiving roller is attached to said connection rod.

* * * * *